(12) United States Patent
Welbourne

(10) Patent No.: US 7,779,787 B2
(45) Date of Patent: *Aug. 24, 2010

(54) VALVE SYSTEM WITH FLOAT CONTROL OF LIQUID DISPENSING

(75) Inventor: Stephen B. Welbourne, Pittsfield, IL (US)

(73) Assignee: Welbourne Innovations, Inc., Pittsfield, IL (US)

( * ) Notice: Subject to any disclaimer, the term of this patent is extended or adjusted under 35 U.S.C. 154(b) by 594 days.

This patent is subject to a terminal disclaimer.

(21) Appl. No.: 11/144,252

(22) Filed: Jun. 3, 2005

(65) Prior Publication Data

US 2006/0027179 A1 Feb. 9, 2006

Related U.S. Application Data

(63) Continuation-in-part of application No. 10/613,840, filed on Jul. 5, 2003, now Pat. No. 6,981,469.

(60) Provisional application No. 60/404,001, filed on Aug. 17, 2002, provisional application No. 60/620,217, filed on Oct. 18, 2004.

(51) Int. Cl.
*A01K 7/04* (2006.01)
*A01K 7/06* (2006.01)

(52) U.S. Cl. ............................... 119/78; 119/75; 119/79

(58) Field of Classification Search ............... 119/51.5, 119/72, 72.5, 74–81
See application file for complete search history.

(56) References Cited

U.S. PATENT DOCUMENTS

| | | | |
|---|---|---|---|
| 2,600,103 A | 6/1952 | Feck | 119/77 |
| 2,678,630 A | 5/1954 | Frederiksen | 119/75 |
| 3,505,978 A | 4/1970 | Nilsen | |
| 3,507,255 A * | 4/1970 | Allen | 119/72.5 |
| 3,527,193 A | 9/1970 | Smith | 119/72.5 |
| 3,550,560 A | 12/1970 | Edstrom | 119/72.5 |
| 3,812,823 A | 5/1974 | Ridder et al. | 119/54 |
| 3,868,926 A | 3/1975 | Olde | 119/75 |
| 3,941,094 A | 3/1976 | Nilsen, Jr. | 119/80 |
| 4,047,503 A | 9/1977 | Wilmot | 119/75 |
| 4,089,350 A | 5/1978 | Gustin | 138/45 |
| 4,134,365 A * | 1/1979 | Futers et al. | 119/51.5 |
| 4,138,967 A | 2/1979 | Tamborrino | 119/78 |
| 4,187,804 A | 2/1980 | von Tarchitzki | 119/72.5 |
| 4,199,000 A | 4/1980 | Edstrom | 137/206 |
| 4,282,831 A | 8/1981 | Nilsen | 119/75 |
| 4,307,682 A | 12/1981 | Bollman | 119/75 |
| 4,320,891 A | 3/1982 | Cairns | 251/332 |
| 4,370,948 A | 2/1983 | Atkins | 119/72.5 |
| 4,402,343 A | 9/1983 | Thompson et al. | 137/614.2 |

(Continued)

FOREIGN PATENT DOCUMENTS

EP 0406607 1/1991

(Continued)

*Primary Examiner*—David J Parsley
(74) *Attorney, Agent, or Firm*—Dascenzo Intellectual Property Law, P.C.

(57) ABSTRACT

A valve system for accepting fluid from a source supply at an upper end thereof, and ejecting it into a liquid container located below the valve system, including a fluid ejection limiting float element control located at the lower end of the valve system, to limit the amount of fluid which can be ejected.

1 Claim, 9 Drawing Sheets

U.S. PATENT DOCUMENTS

| | | | |
|---|---|---|---|
| 4,416,221 A | 11/1983 | Novey | 119/72.5 |
| 4,538,791 A | 9/1985 | Wostal | 251/339 |
| 4,539,938 A | 9/1985 | Maranell et al. | 119/75 |
| 4,779,571 A | 10/1988 | Row | 119/75 |
| 4,819,585 A | 4/1989 | Dolan et al. | 119/72.5 |
| 5,003,927 A | 4/1991 | Thompson | 119/72.5 |
| 5,065,700 A | 11/1991 | Cross | 119/72.5 |
| 5,070,817 A | 12/1991 | Momont | 119/75 |
| 5,154,138 A | 10/1992 | Siddiqui et al. | |
| 5,456,210 A | 10/1995 | Miller | 119/75 |
| 5,730,082 A * | 3/1998 | Newman | 119/51.5 |
| 5,839,466 A * | 11/1998 | Dutter | 137/414 |
| 5,845,600 A * | 12/1998 | Mendes | 119/51.5 |
| 6,003,468 A | 12/1999 | Edstrom, Sr. et al. | 119/72.5 |
| 6,073,584 A | 6/2000 | Schumacher | 119/72 |

FOREIGN PATENT DOCUMENTS

| | | |
|---|---|---|
| GB | 2134765 | 8/1984 |

\* cited by examiner

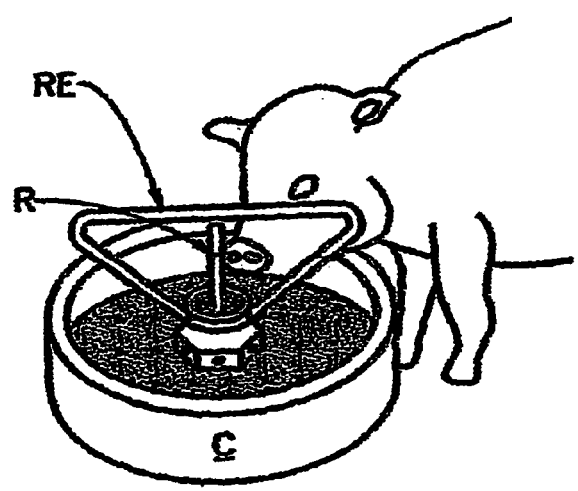
FIG. 1c
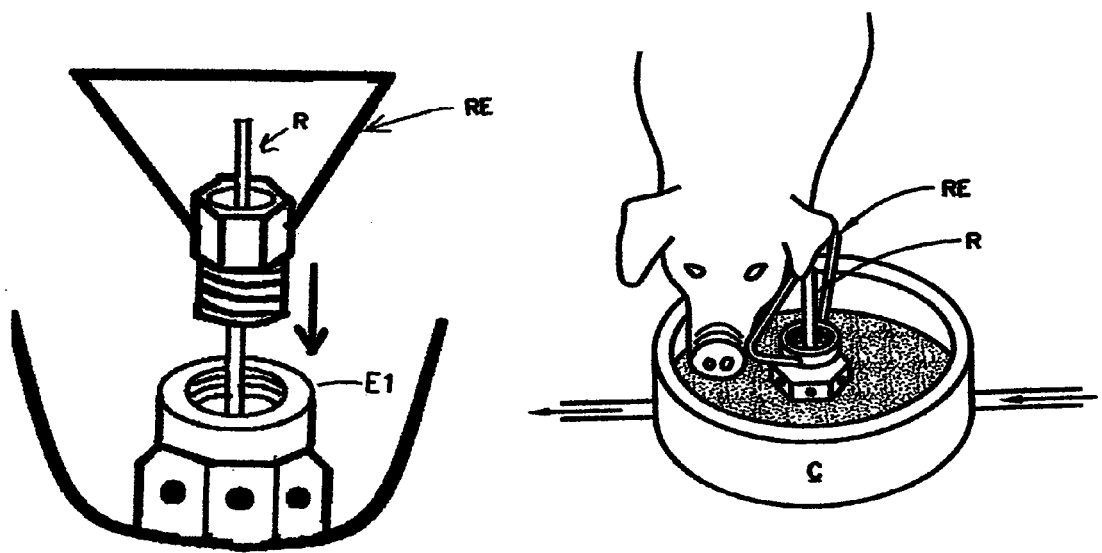
FIG. 1e
FIG. 1d

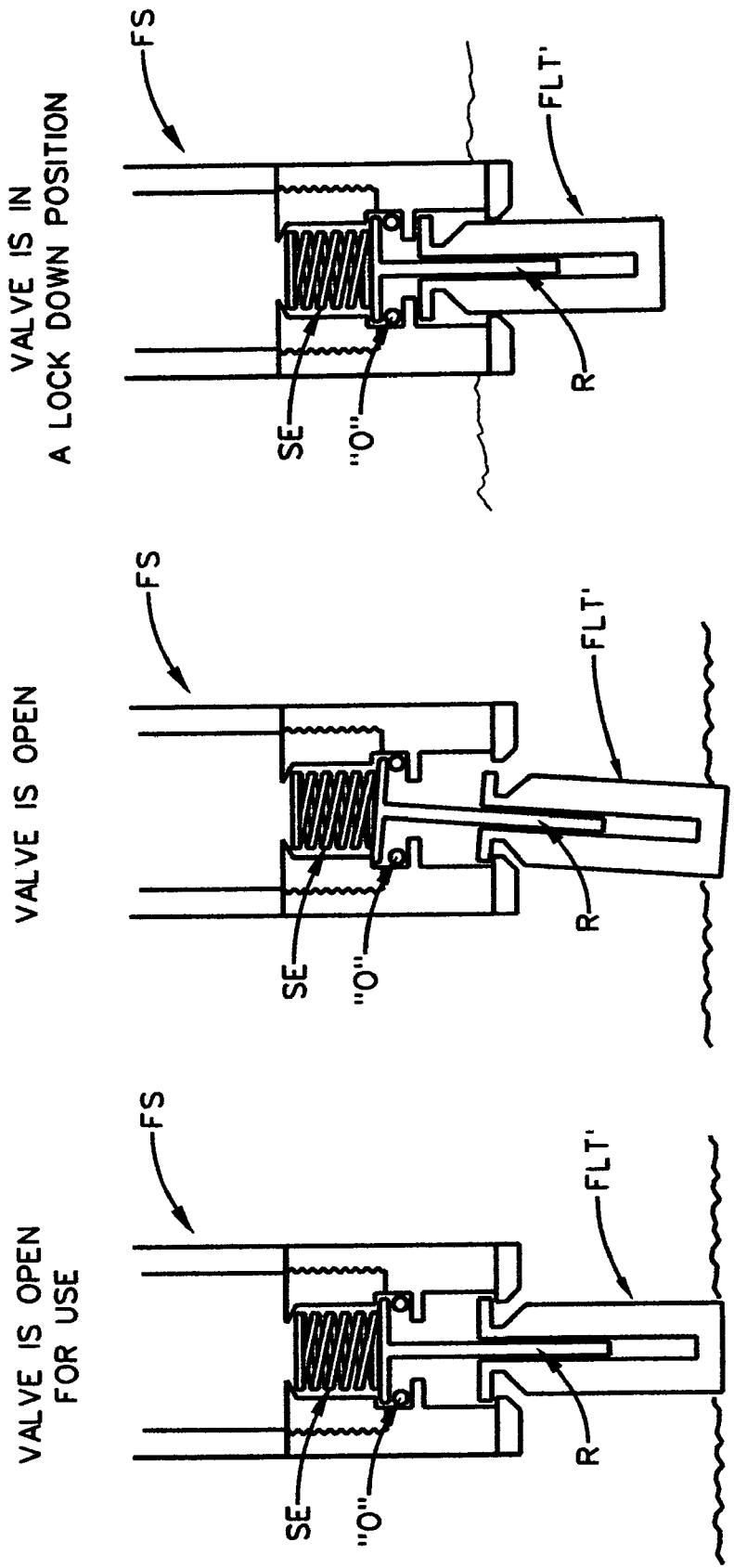

VALVE SYSTEM WITH FLOAT CONTROL OF LIQUID DISPENSING

This Application is a CIP of Ser. No. 10/613,840 Filed Jul. 5, 2003 now U.S. Pat No. 6,981,469 and claims Benefit of Provisional Application Ser. Nos. 60/404,001 Filed Aug. 17, 2002, and 60/620,217 Filed Oct. 18, 2004.

TECHNICAL FIELD

The disclosed invention relates to systems and methods for controlling fluid flow, and more particularly to a valve system comprising means for accepting fluid from a source supply at an upper end thereof, and ejecting said fluid into a means for containing liquid located below said valve system. An automatic fluid ejection limiting float element control located at a lower extent thereof further distinguish the disclosed system. The disclosed system finds application in a methodology for watering or liquid feeding of animals, such as pigs.

BACKGROUND

There are presently a number of cup-based liquid feeders available in the marketplace, use of which have demonstrated proven utility. Most such cup-based liquid feeders incorporate what is termed an "Edstrom" liquid feeder system. While performing the basic function required thereof, Edstrom liquid feeders demonstrate inefficiencies which innovation in system design could eliminate. For instance, as piglets grow older they often become more active and some tend to "playfully" over-activate a "spray" causing liquid feeder system to operate to the point that liquid is wastefully ejected beyond the cup, or fills the cup and then wastefully overflow-spills therewithin, (ie. pigs like to cool themselves with water and fill the cup to the point of overflow so that they can lay on the moist floor).

The invention disclosed herein recognizes the foregoing points and provides system and method improvements in the identified areas.

With the disclosed invention in mind, Patent Searching was conducted.

A U.S. Pat. No. 5,456,210, to Miller, describes a watering system for poultry and the like. The system includes a deflector bell which guides water jets downward into a cup. A perceived problem with this system is that if water is ejected at high pressure it can bounce from the bottom of the cup and splash vertically out of the cup. If used to feed piglets, they can be startled by either direct vertical ejection or such reflected vertical ejection. In contrast, it is noted that a substantially lateral fluid ejection would provide utility. Further, it is noted that the 210 system is designed for use by poultry, which tend not to effectively mix liquid feed as they feed. Piglets, on the other hand, feed by forcing their snouts into a cup, and by said action tend top naturally keep solids in liquid in suspension.

Another U.S. Pat. No. 4,779,571 to Row describes a system which allows watering poultry which includes a cup with a raised central plateau portion that defines a cup supply hole fed from a connecting passage. A pecking tip is present, motion of which allows water passage past said cup supply hole.

Another U.S. Pat. No. 5,070,817 to Momont describes a system with a back flow preventing means. U.S. Pat. No. 4,402,343 to Thompson et al. also describes a system with back flow preventing means therewithin.

U.S. Pat. No. 4,538,791 to Wostal describes a valve system mechanism for a livestock watering bowl. The valve system is operated by a plunger motion.

Additional Patents which describe systems which include the presence of back-flow restricting means are:
U.S. Pat. No. 4,199,000 to Edstrom Sr. et al.
U.S. Pat. No. 4,282,831 to Nilsen;
U.S. Pat. No. 4,187,804 to von Taschitzki;
U.S. Pat. No. 4,138,967 to Tamborrino;
U.S. Pat. No. 4,047,503 to Wilmont;
U.S. Pat. No. 3,868,926 to Olde;
U.S. Pat. No. 3,527,193 to Smith; and
U.S. Pat. No. 3,505,978 to Nilsen.

As regards systems which can be activated by mechanical action to cause liquid to flow therefrom, the most relevant Patents are:
U.S. Pat. No. 4,089,350 to Gustin;
U.S. Pat. No. 5,003,927 to Thompson; and
U.S. Pat. No. 6,003,468 to Edstrom Sr. et al.
U.S. Pat. No. 3,941,094 to Nilsen Jr.

Additional Patents which describe functionally relevant systems are:
U.S. Pat. No. 5,510,177 to Edstrom Sr. et al.
U.S. Pat. No. 5,065,700 to Cross;
U.S. Pat. No. 4,416,221 to Novey;
U.S. Pat. No. 4,370,948 to Atkins;
U.S. Pat. No. 4,819,585 to Dolan et al.
U.S. Pat. No. 4,320,891 to Cairns.
U.S. Pat. No. 3,550,560 to Edstrom.

Further, Patents which focus on liquid dispensing are:
U.S. Pat. No. 6,101,976 to Gustin;
U.S. Pat. No. 4,246,870 to Gustin;
U.S. Pat. No. 3,941,094 to Nilsen, Jr.
U.S. Pat. No. 3,812,823 to Ridder et al.

Need remains for improved systems and methodology for application in watering or liquid feeding of animals.

DISCLOSURE OF THE INVENTION

In a basic sense, the disclosed invention is a valve system for providing liquid to a means for containing liquid comprising, as viewed in side elevation:

a body comprising means for entering liquid at an upper end thereof and means for ejecting liquid at a lower end thereof, there being functionally integrated thereinto rod means for controlling flow of liquid through said valve system, such that when said rod means is caused to be moved laterally liquid can flow, but when said rod means is oriented to project substantially downward liquid does not flow, said rod means being projected out of the lower end of said body.

Importantly, said valve system further comprises float means at the lower end thereof, and said lower end of said body is, during use, present in said means for containing liquid. In use said rod means is occasionally caused move laterally with the result being that liquid flows into, through, and out of said valve system into said means for containing liquid wherein it accumulates. Said float is functionally implemented so that, as liquid accumulates in said means for containing liquid, said float is caused to rise into said body and block further occasional lateral rod means motion until said accumulated liquid is removed from said means for containing liquid and said float decends out of said body. (It is noted that even when the float prevents significant rod motion, a greatly reduced amount of liquid which might still exit said valve. That is, while it can be designed to do so, the float operation does not necessarily prevent all liquid flow).

A method of providing water or liquid feed to a means for containing water or liquid feed, for the purpose of watering or feeding animals, comprises the steps of:
   a) providing a valve system as described above;
   b) occasionally causing said rod means to be moved laterally so that water or liquid feed flows into said means for containing water or liquid feed.
   c) when water or liquid feed accumulates in said means for containing water or liquid feed, allowing said float means to rise in said lower region of said lower cavity region and secure said projected rod of said rod mean, such that said rod means can not be moved laterally.

A more detailed recitation of a valve system for providing liquid to a means for containing liquid provides that it comprise, as viewed in side elevation, a body element with means for attaching to a source of liquid at an upper end thereof, said body element comprising a cavity with upper and lower cavity portions, each thereof being comprised of at least one section of a selected diameter and the lower portion thereof typically comprising at least two such regions. The upper end of said upper cavity region, the boundary between said upper and lower cavity portions, and the lower end of said lower cavity region are of a narrowed diameter. Said upper cavity has therewithin a spring means and the upper end of a rod means, each of which are of a smaller diameter than the inner diameter of said at least one section of said upper cavity region, but larger than the diameter of the boundary between said upper and lower cavity portions. Said rod means further comprises a projected rod, of a diameter smaller than the diameter of the boundary between said upper and lower cavity portions, at a substantially 90 degree angle to said upper end of said rod means, said upper cavity portion further having a "O" ring, or other sealing means, atop the narrowed diameter boundary between said upper and lower cavity portions. Said spring means causes application of force between the narrowed diameter of the upper end of said upper cavity portion and the upper end of said rod means and forces said upper end of said rod means against said "O" ring which is atop the narrowed diameter boundary between said upper and lower cavity portion. The lower cavity portion has therewithin a float means having a centrally located hole therethrough such that said projected rod of said rod means projects through said centrally located hole and out of said body element. A means for containing liquid is positioned beneath said valve system, and said lower cavity portion is comprised of at least two regions which are of different diameters. Said float means is of a diameter just slightly smaller than the diameter of the upper region of said lower cavity portion so that it can fit thereinto, but said float is of a smaller than the diameter of the lower region of said lower cavity portion. In use liquid is caused to enter said valve system at the means for attaching to a source of liquid at the upper end thereof, flow through said upper and lower cavity portions thereof and accumulate in said means for containing liquid when said rod means is occasionally caused to move laterally to provide space between said "O" ring and the upper end of said rod means and the narrowed diameter boundary between said upper and lower cavity portions. Said lateral motion can be effected by the nudging of an animal. Said lower cavity portion is placed into said means for containing liquid such that as liquid accumulates said float rises into the upper region of said lower cavity portion when said rod means is not caused to be moved laterally. When said float means is present in said lower region of said lower cavity portion said rod means can be moved laterally, and when said float means is present in said upper region of said lower cavity portion, said rod means can not be moved laterally.

The float means is characterized by a selection from the group consisting of:
   it is substantially spherical and fully present in said lower cavity portion;
   it is disk shaped and fully present in said lower cavity portion;
   it is substantially tubular shaped with an upper lip present inside said lower cavity portion, said upper lip being of a diameter which is larger than that of the narrowed diameter of said lower end of said lower cavity portion, said substantially tubular shaped float means being at least partially encompassing of said projected rod of said rod means which is projected out of said lower cavity portion;
   it is substantially tubular shaped with an upper lip present inside said lower cavity portion, said upper lip being of a diameter which is larger than that of the narrowed diameter of said lower end of said lower cavity portion, said substantially tubular shaped float means being at least partially encompassing of said projected rod, of said rod means, which is projected out of said lower cavity portion, (note, this shelters the upper end of the float from debris such as animal feed particles, which otherwise can become wedged between the rod and float and prevent operation), said float means having, at its lower extent, an open bottom but otherwise closed cavity for containing an air bubble;
   it is substantially tubular shaped and at least partially encompassing of said projected rod, of said rod means, which is projected out of said lower cavity portion, said float means having, at its lower extent, an open bottom but otherwise closed cavity for containing an air bubble;
   it is substantially tubular shaped and at least partially encompassing of said projected rod of said rod means which is projected out of said lower cavity portion, said float means having, at its lower extent, an open bottom but otherwise closed cavity for containing an air bubble, and there at least one hole through said tubular shaped float means which connects the outside and inside thereof to prevent air from accumulating in the annular portion between said projected rod of said rod means and the substantially tubular shaped float means which is at least partially encompassing of said projected rod;
   it is substantially tubular shaped and at least partially encompassing of said projected rod, of said rod means, which is projected out of said lower cavity portion.

The float is preferably made of a plastic material that floats on the liquid, (eg. polypropylene or Ultra High Molecular Weight (UHMW) material.

The valve system just described can be modified by eliminating the narrowed diameter of the lower end of said lower cavity region, if the float selection is reduced to being from the group consisting of:
   it is substantially tubular shaped and at least partially encompassing of said projected rod, of said rod means, which is projected out of said lower cavity portion, said float means having, at its lower extent, an open bottom but otherwise closed cavity for containing an air bubble;
   it is substantially tubular shaped and at least partially encompassing of said projected rod of said rod means which is projected out of said lower cavity portion, said float means having, at its lower extent, an open bottom but otherwise closed cavity for containing an air bubble, and there at least one hole through said tubular shaped float means which connects the outside and inside thereof to prevent air from accumulating in the annular portion between said projected rod of said rod means and the substantially tubular shaped float means which is at least partially encompassing of said projected rod;

it is substantially tubular shaped and at least partially encompassing of said projected rod, of said rod means, which is projected out of said lower cavity portion.

Again, a method of providing water or liquid feed to a means for containing water or liquid feed, for the purpose of watering or feeding animals, comprises the steps of:

a) providing a valve system for providing water or liquid feed to a means for containing water or liquid feed as described just above;

b) allowing an animal to effect lateral motion of said rod means which results in dispensing of water or liquid feed into said means for containing water or liquid feed.

c) allowing water or liquid feed to accumulate in said means for containing water or liquid feed, and causing said float means to rise in said lower region of said lower cavity portion and secure said projected rod of said rod means, such that said rod means can not be moved laterally.

The disclosed invention will be better understood by reference to the Detailed Description Section in combination with the Drawings.

SUMMARY OF THE INVENTION

It is therefore a purpose and/or objective of the disclosed invention to provide a simple and economical to manufacture valve system for dispensing liquid, said valve system including a float means in a lower cavity portion which serves to prevent additional liquid dispensing when a means for containing liquid contains sufficient liquid therewithin.

It is another purpose and/or objective of the disclosed invention to teach application of the disclosed valve system for dispensing liquid in watering or feeding animals.

Other purposes and/or objectives of the disclosed invention will become apparent upon a reading of the Specification and claims.

BRIEF DESCRIPTION OF THE DRAWINGS

FIGS. 1a-1e show previously submitted material showing Valve System and Use thereof, to serve as comparison for the newly disclosed material.

FIGS. 4a-4h show newly disclosed Valve Systems with various Automatic Operation Control Floats in place. Note that the Floats can not be easily removed from the lower end of the Valve System.

DETAILED DESCRIPTION

Figure 1A:
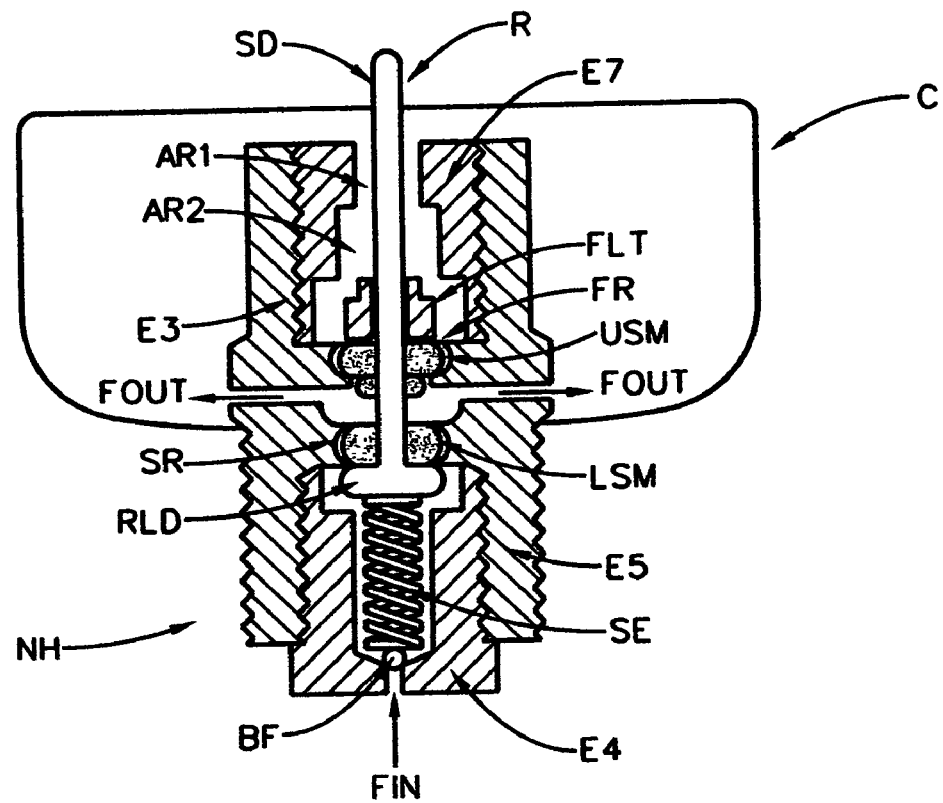
Figure 1B:
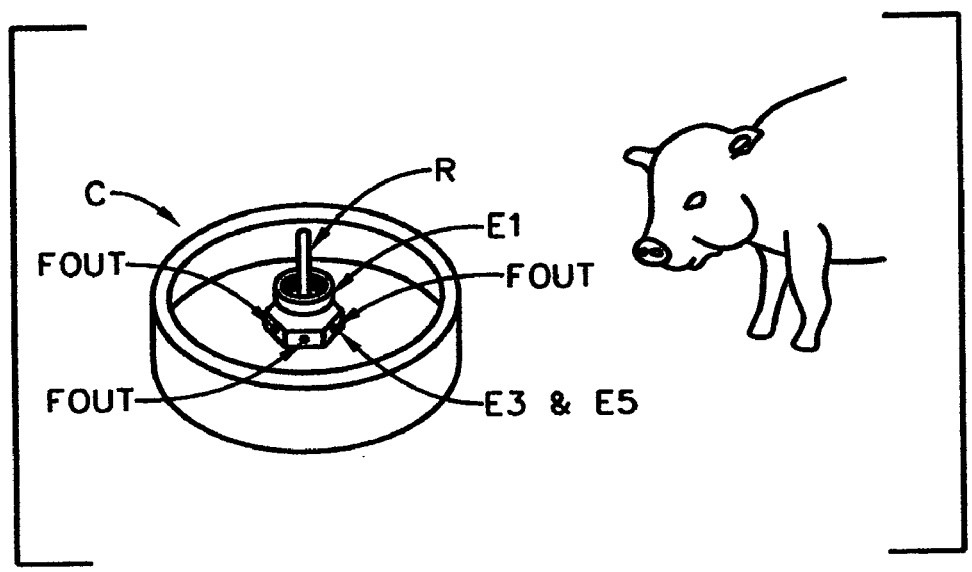

Turning now to the Drawings, there is shown in FIGS. 1a and 1b systems which were disclosed in Parent application Ser. No. 10/613,840. FIG. 1a shows a Valve comprising a Cup (C) and basic Nipple Housing (NH) structural elements (E3) (E4) (E5) and (E7). Note that structural element (E7) screws into structural element (E3), and that structural element (E4) screws into structural element (E5). Note that Structural Elements (E3) and (E5) are typically the upper and lower portions of a single continuous element. Note also the presence of a Rod (R) which has an increased diameter region (RLD), and that said Rod (R) is secured by Upper (USM) and Lower (LSM) Seal Means arrangements. Note that a primary function of (USM) is to prevent liquid from exiting above the float (FLT). Upper Seal Means (USM) can be, but is not necessarily, contained in a First Diameter Restricting Means (FR) a shown, and the Lower Seal Means (LSM) is contained in the Second Diameter Restricting means (SR). The (RLD) is acted on by a Spring (SE) which serves to keep Rod (R) oriented essentially vertically. When Rod (R) is pushed laterally, Fluid (FIN) which enters from below by passing by Check Valve (BF) and the Lower Seal Means (LSM) and ejects laterally into the Cup (C) as (FOUT). Note also that there is shown a Float (FLT) which is made from material with is buoyant in a present Fluid, and which automatically restrict the Rod Means (R) motion when said fluid causes it to rise in Element (E7). Any functional shape Float and Annular space combination is within the scope of the disclosed invention. When the Float (FLT) is unelevated it has negligible effect on the Rod Means (R) motion, but as it rises upward in Element (E7) its size/shape causes it to restrict possible Rod Means (R) motion. It is noted that while Fluid will enter the central region of Element (E7) mostly from the top. The Annular Space in Element (E7) is shown to be smaller at the upper location (AR1) than it is at a lower position (AR2), such that Float (FLT) rising will serve to automatically restrict possible rod means motion. Note that when fluid level lowers, a present Float lowers and increased rod means motion again becomes possible. FIG. 1b demonstrates the Cup (C), Rod (R) and (FOUT) as it appears in practice. A piglet, for instance, can nudge Rod (R) laterally, and cause Fluid (FOUT) to enter the Cup (C), until Float (FLT) rises in said Cup (C) because sufficient Fluid is already present therein to cause said Float (FLT) to rise into areas (AR2) and (AR1). FIGS. 1c and 1d show a structural element (E1), which can be screwed into Element (E7) in FIG. 1a can have a Restriction Extension (RE) affixed thereto to obscure a piglet's access to the Rod (R). FIG. 1c also serves to show a piglet nudging the Rod (R) laterally. FIG. 1e shows the preferred embodiment of the Restriction Extension (RE) provides that it have screw threads for easy mounting to element (E1).

The foregoing Figures are presented as background for the concept of implementing Float as a means for automatically controlling fluid flow by restricting Rod (R) motion when fluid rises in the Cup (C). While the Valve shown in FIG. 1a works, it has been found that said FIG. 1a Valve is relatively expensive to manufacture.

Figure 2A:
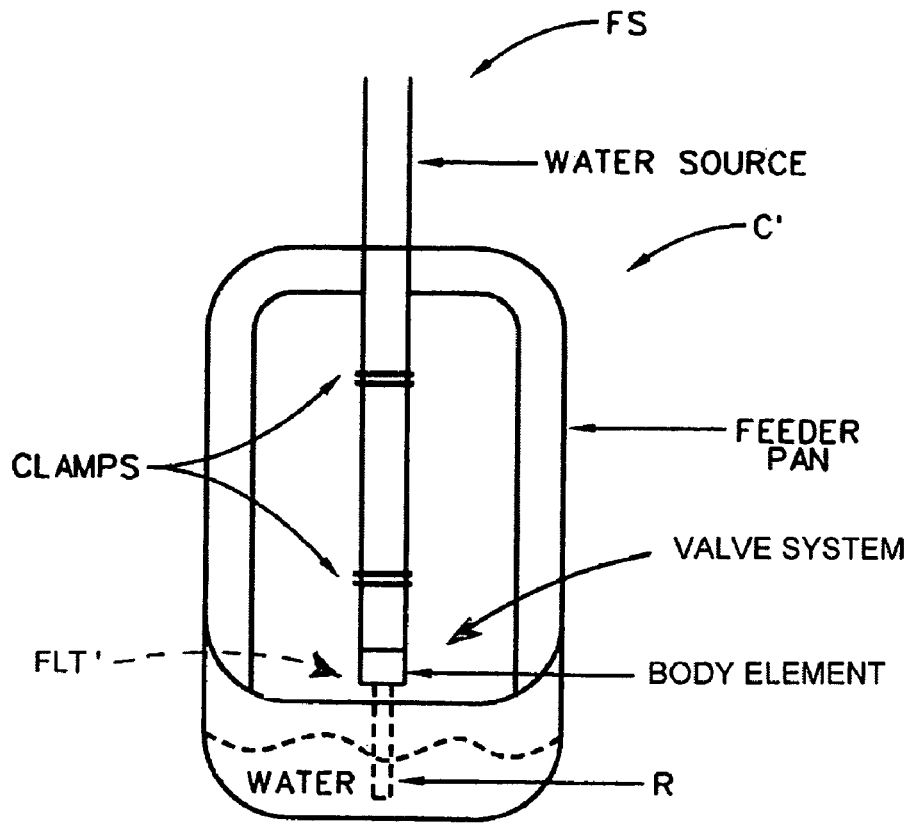
FIGS. 2a-2c show the newly disclosed system fluid containing means, as fitted with a newly disclosed Valve System.
Figure 2B:
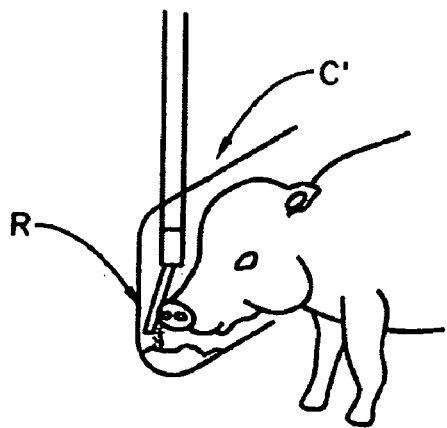
Figure 2C:
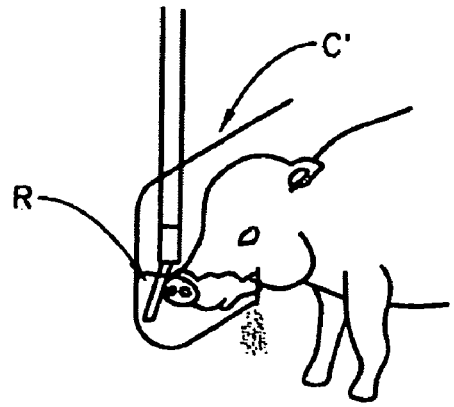

Turning now to FIGS. 2a-2c, there is shown the presently disclosed invention in Front View (ie. FIG. 2a), and in Side view with a piglet activating a Rod (R), which causes fluid to flow into the Modified Cup (C'), (ie. a Feeder Pan). Note that FIG. 2c shows that if the Rod (R) remains effective even when the Modified Cup (C') is full and spilling fluid, piglets at times continue to activate the Rod (R) in a "playful" manner, or to wet the floor so that they can lay in the liquid to cool themselves, which is wasteful of fluid. It would be optimum then, if when the fluid is at a level such as shown in FIG. 2a, the Rod (R) would be disabled, (ie. pushing on it does not result in more fluid being released into the Modified Cup (C'). It should be appreciated that when a Float (FLT') is applied to a system as shown in FIGS. 2a-2c, it is preferable positioned so that it can not slip off the Rod (R). That is, the bottom of (C') is sufficiently close to the lower end of the Float (FLT) that said (FLT') contacts it before the upper end of the (FLT') comes off the Rod (R).

Note that as opposed to the system shown in FIG. 1a, fluid is entered to the presently disclosed system from a means (FS) for entering fluid located at the Upper End of the Modified Cup (C').

With the basic layout and use of the presently disclosed invention system now introduced, attention is now turned to Valve Design—Float combinations which function to allow some amount of fluid to be ejected by occasional lateral movement of a Rod (R), but which prevent operation of the Rod (R) when ejection of more fluid would likely be wasteful. As the specific design of a Valve is not critical, detail as shown in FIG. 1a is not provided in what follows. Rather it is the general orientation of Fluid Source, (located at the upper end), and Ejections means, (located at the lower end), of the Valve which is of critical importance, in combination with the placement of the Rod (R) Movement Restrictor Float (FLT'), (also at the lower end), which is new and novel. The following Figures show numerous specific embodiments which follow said general theme. A2

Figure 3A:
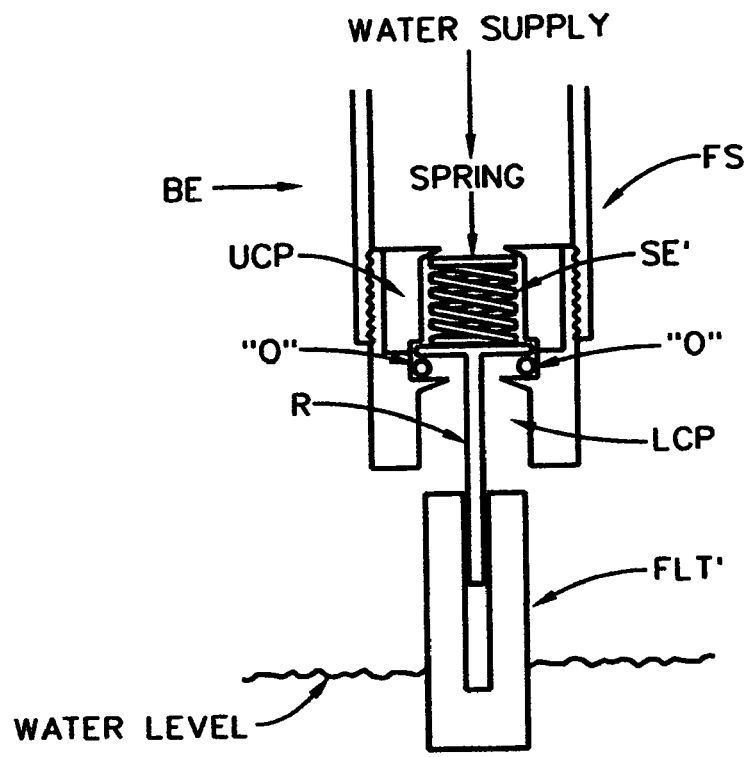
FIGS. 3a-3h show newly disclosed Valve Systems with various Automatic Operation Control Floats in place. Note that the Floats can be easily slipped from the lower end of the Valve System.
Figure 3B:
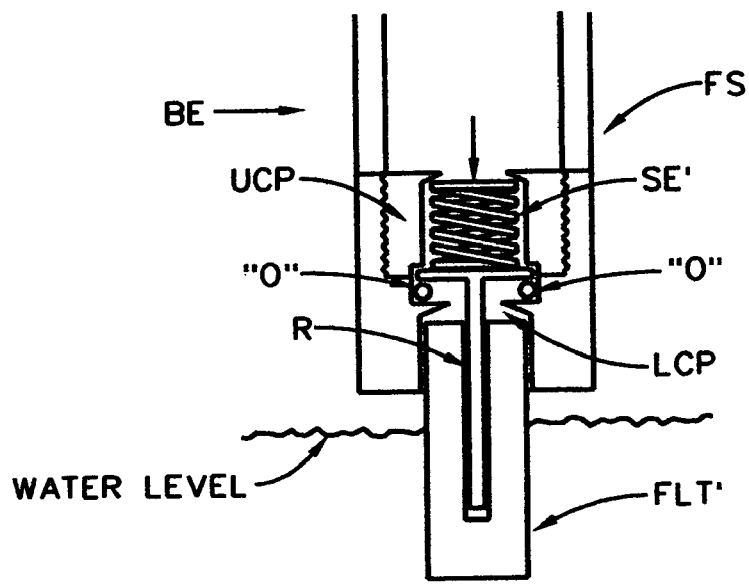
Figure 3E:
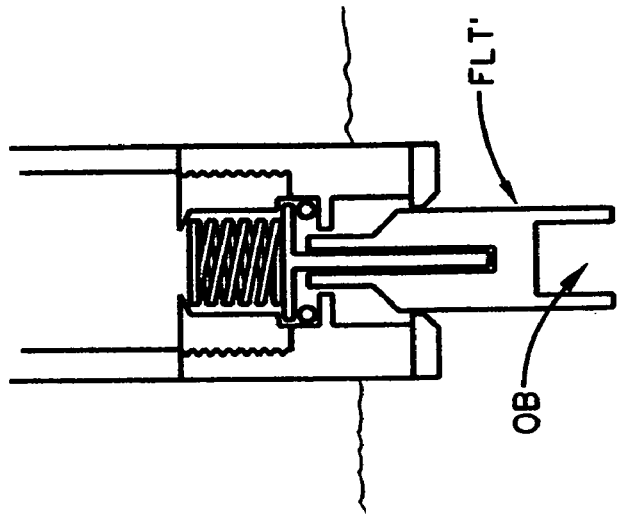
Figure 3D:
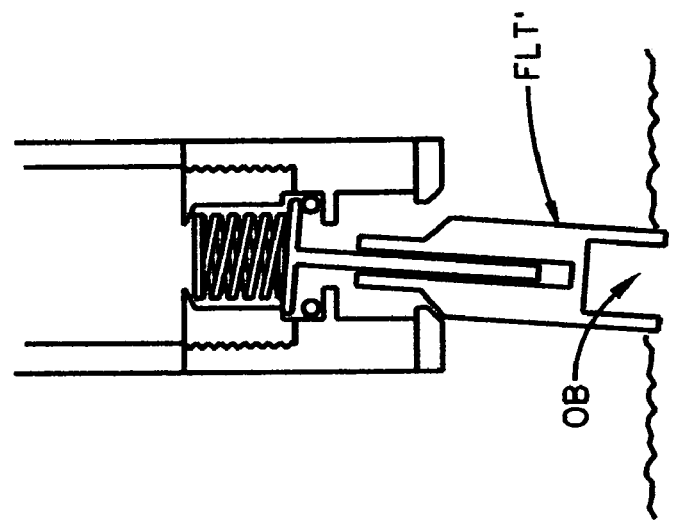
Figure 3C:
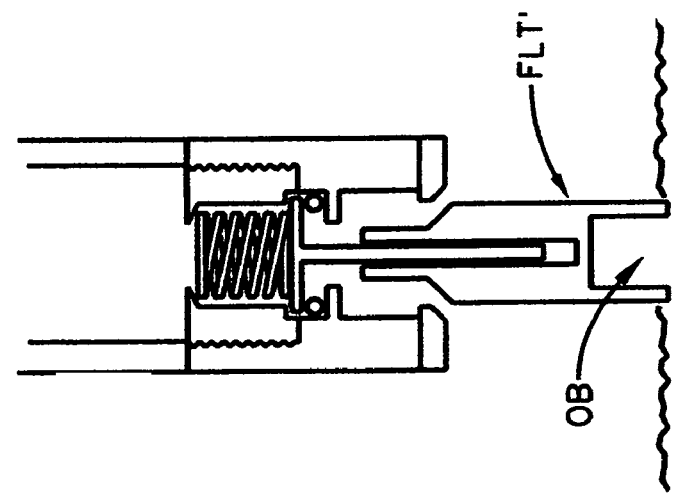
Figure 3H:
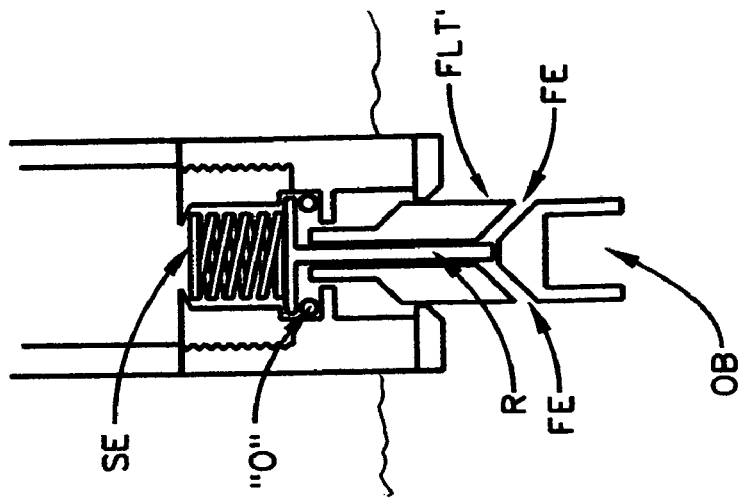
Figure 3G:
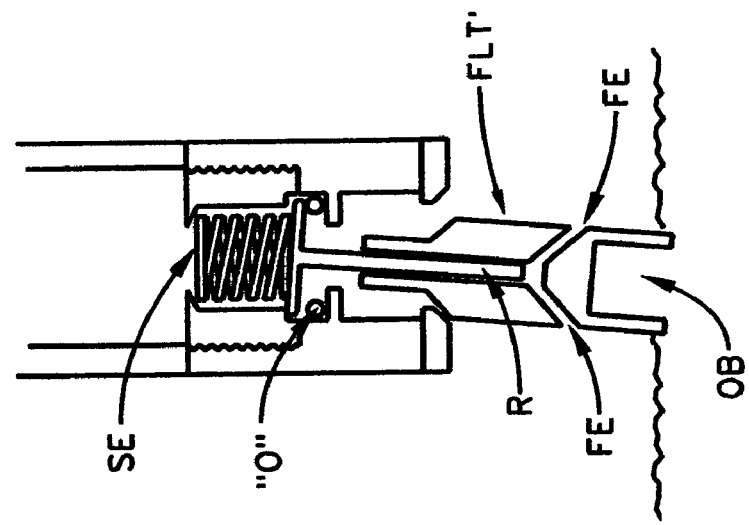
Figure 3F:
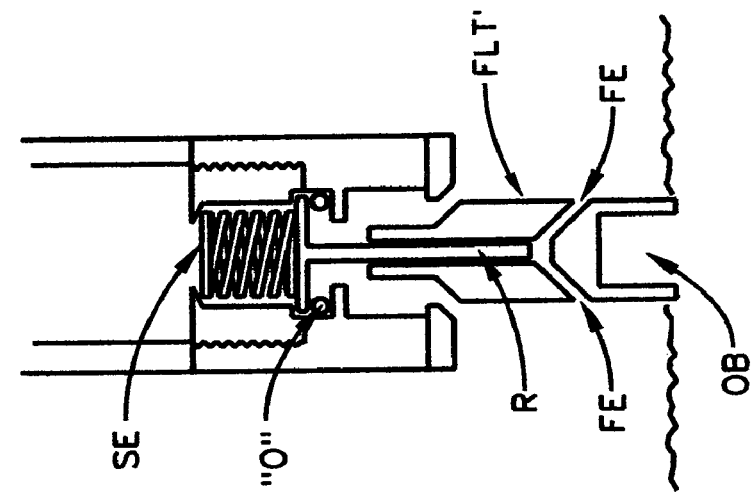

FIGS. 3a and 3b show a Valve with a Body Element (BE) with means for attaching to a source of liquid (FS) at an upper end thereof, said Body Element (BE) comprising a Cavity with Upper (UCP) and Lower (LCP) Cavity Portions, each thereof being comprised of at least one section of a selected diameter. Note that the upper end of said Upper Cavity portion and the Boundary between said Upper (UCP) and Lower (LCP) Cavity Portions are of a narrowed diameter. Said Upper Cavity has therewithin a Spring (S) means and the Upper End of a Rod means, each of which are of a smaller diameter than the inner diameter of said at least one section of said Upper (UCPO Cavity portion, but larger than the diameter of the boundary between said Upper (UCP) and Lower (LCP) Cavity Portions. Note that said Rod Means provides a projected Rod (R), of a diameter smaller than the diameter of the boundary between said Upper (UCP) and Lower (LCP) cavity portions, at a substantially 90 degree angle to said Upper End of said Rod Means. Said Upper (UCP) Cavity portion further has a "O" ring atop the narrowed diameter boundary between said Upper (UCP) and Lower (LCP) cavity portions. Note that said Spring (se) means causes application of force between the narrowed diameter of the Upper end of said Upper (UCP) Cavity Portion and the Upper end of said Rod Means and forces said Upper end of said Rod Means against said "O" Ring which is atop the narrowed diameter boundary between said Upper (UCP) and lower (LCP) cavity portions. Of primary significance is that said Lower (LCP) Cavity Portion has therewithin a Float (FLT') means having a centrally located hole therethrough, through said Projected Rod (R) of said Rod Means projects, and which further extends out of said Body Element (BE). Note that lateral motion of said Projected Rod (R), such as that caused by the nudging of an animal which desires dispensing of liquid, causes the Top of said Rod Means to separate from the "O" rings and allow fluid to pass. Note that the Float (FLT') means is characterized as being substantially tubular shaped and at least partially encompassing of said Projected Rod (R), of said rod means, which is projected out of said Lower (LCP) Cavity Portion, said Float (FLT') means having, at its lower extent, a closed bottom. FIGS. 3c, 3d and 3e show an alternative Float (FLT') Means is sustantially as described for the FIGS. 3a and 3b embodiments. Said Float (FLT') means is tubular shaped and at least partially encompassing of said Projected Rod (R) of said Rod Means, which is projected out of said Lower (LCP) Cavity Portion. Said Float (FLT') means has, at its lower extent, an Open Bottom (OB) but otherwise Closed Cavity for containing an Air Bubble, and there can be at least one hole through said tubular shaped float means which connects the outside and inside thereof to prevent air from accumulating in the annular portion between said projected rod of said Rod (R) means and the substantially tubular shaped Float (FLT) means which is at least partially encompassing of said Projected Rod (R). FIGS. 3f, 3g and 3h show Float (FLT') Means similar to those in the directly preceding Figures, but note that presence of a Open Bottom (OB) Cavity. Said Open Bottom (OB) Cavity is present to accumulate Air to add buoyancy to the Float (FLT') Means. Further, note the presence of Holes (FE) in the sides of the Float (FLT'). Said Holes (FE) allow water to escape which entered the float (FLT') through the Valve Body. For instance, Sediment such as Minerals can get trapped between the Rod (R) and the Float (FLT') can be prevented from accumulating by liquid flow through said Holes (FE). And, again, the preferred material from which to make the Float is Polypropylene or UHMW material.

Turning now to FIGS. 4a-4h, there are shown embodiments in which, unlike the embodiments of FIGS. 3a-3h, a Float (FLT') Means is secured in the Lower (LCP) Cavity Portion. In other respects, (ie. the presence of (FS), "O", (SE), (FLT') and (R) and in FIGS. 4a and 4b, (C')), the description of Valve in FIGS. 4c-4h is very much the same as that for FIGS. 3a-3h. The major difference is the not only are the upper end of said Upper Cavity portion and the Boundary between said Upper (UCP) and Lower (LCP) Cavity Portions are of a narrowed diameter, but as well, the lower end of the Lower (LCP) Cavity Portion is also of a narrowed diameter, and it is that aspect of the Valve design which secures the Float (FLT') into the Lower (LCP) Cavity Portion. In conjunction therewith, the Float (flt') Means is characterized by a selection from the group consisting of:

it is substantially spherical and fully present in said Lower (LCP) Cavity Portion;

it is disk shaped and fully present in said Lower (LCP) Cavity Portion;

it is substantially tubular shaped with an upper lip present inside said Lower (LCP) Cavity Portion, said upper lip being of a diameter which is larger than that of the narrowed diameter of said lower end of said Lower (LCP) Cavity Portion, said substantially tubular shaped Float (FLT') Means being at least partially encompassing of said Projected Rod (R) of said rod means which is projected out of said Lower (LCP) Cavity Portion;

it is substantially tubular shaped with an upper lip present inside said Lower (LCP) Cavity Portion, said upper lip being of a diameter which is larger than that of the narrowed diameter of said lower end of said Lower Cavity (LCP) Portion, said substantially tubular shaped Float (FLT') Means being at least partially encompassing of said Projected Rod (R), of said rod means, which is projected out of said Lower (LCP) Cavity Portion, said Float (FLT') Means having, at its lower extent, an Open Bottom (OB0 but otherwise closed cavity for containing an air bubble;

it is substantially tubular shaped and at least partially encompassing of said projected rod, of said rod means, which is projected out of said Lower (LCP) Cavity Portion, said Float (FLT') Means having, at its lower extent, an Open Bottom (OB) but otherwise closed cavity for containing an air bubble;

it is substantially tubular shaped and at least partially encompassing of said Projected Rod (R) of said rod means which is projected out of said Lower (LCP) Cavity Portion, said Float (FLT') Means having, at its lower extent, an Open Bottom (OB) but otherwise closed cavity for containing an air bubble, and there at least one hole through said tubular shaped float means which connects the outside and inside thereof to prevent air from accumulating in the annular portion between said Projected Rod (R) of said rod means and the substantially tubular shaped Float (FLT') Means which is at least partially encompassing of said Projected Rod (R);

it is substantially tubular shaped and at least partially encompassing of said Projected Rod (R), of said rod means, which is projected out of said Lower (LCP) Cavity Portion.

It is generally noted that the sequence of:

FIGS. 3c-3d-3e; and

FIGS. 3f-3g-3h; and

FIGS. 4c-4d-4e; and

Figure 4B:
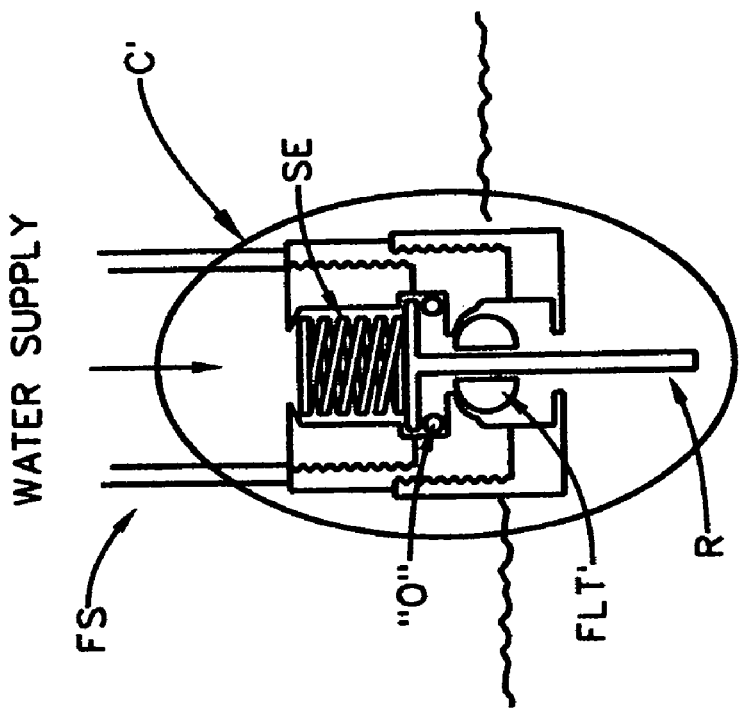
Figure 4A:
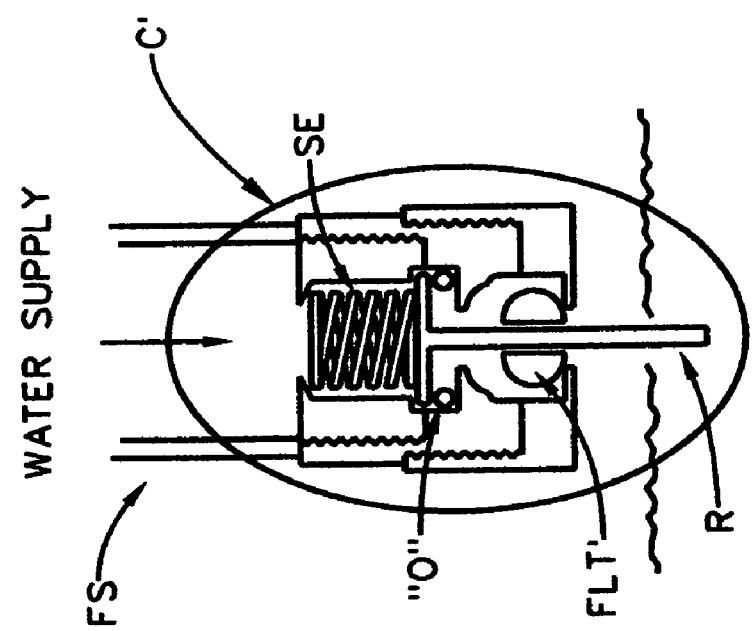
Figure 4H:
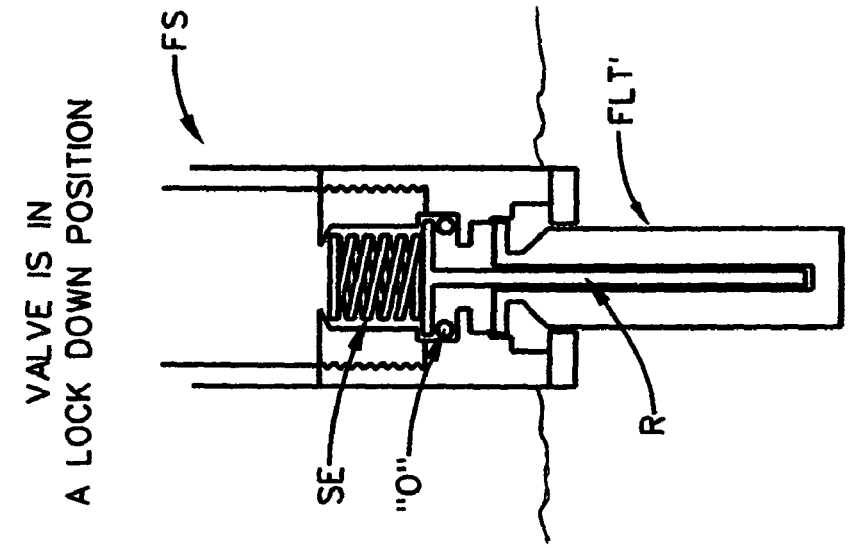
Figure 4G:
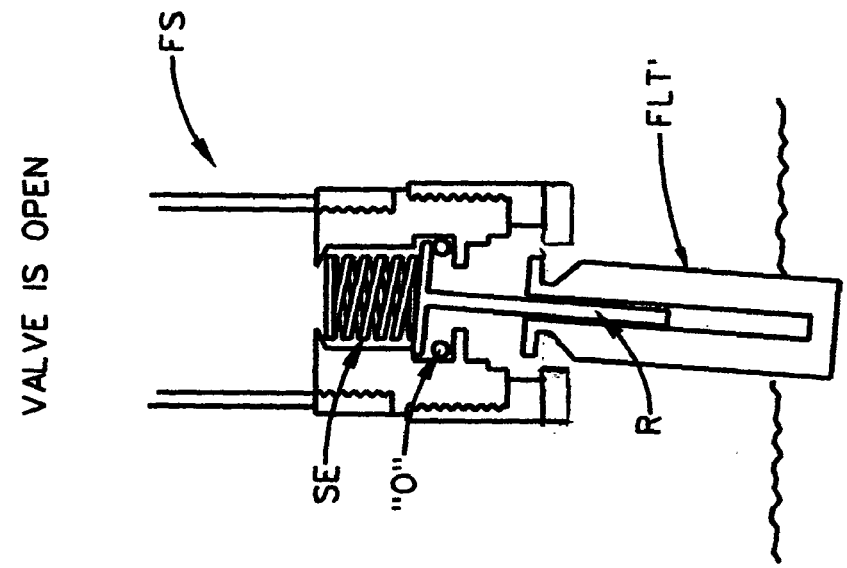
Figure 4F:
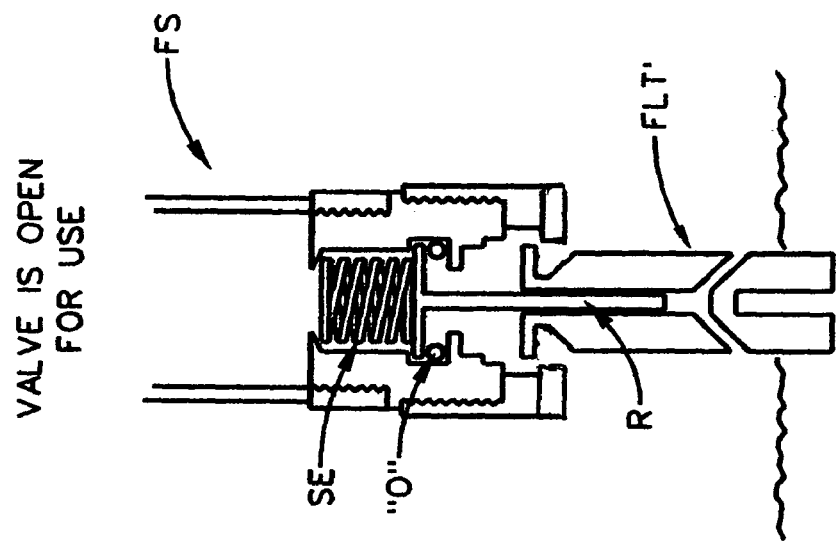

FIGS. 4f-4g-4h;

show the Valve System in a Resting position, in an position wherein the Projected Rod (R) is pushed laterally and in which fluid is allowed to flow, and in a Float Controlled position in which the Rod (R) can not be activated because the Cup (C') is full of fluid, respectively. After the last shown position in each sequence, a piglet, for example, will consume the fluid accumulated in he Cup (C'), and the sequence will be repeated, perhaps bypassing the first shown position at times. This is the sequence which the present invention will progress through over and over during, for instance, use in the watering or feeding of animals.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

I claim:

1. A valve system for providing liquid to a means for containing liquid comprising, as viewed in side elevation:

a body comprising means for entering liquid at an upper end thereof and means for ejecting liquid at a lower end thereof, there being functionally integrated thereinto rod means for controlling flow of liquid through said valve system, such that when said rod means is caused to be moved laterally liquid can flow, but when said rod means is oriented to project substantially downward liquid does not flow, said rod means being substantially vertical along its length and projected out of the lower end of said body;

said valve system further comprising float means slidingly coupled to said rod means;

the lower end of said body being present in said means for containing liquid;

such that in use said rod means is occasionally caused to move laterally by an animal's direct contact with at least one of said rod means and said float means with the result being that liquid flows into, through, and out of said valve system into said means for containing liquid wherein it accumulates;

said float means being functionally implemented so that, as liquid accumulates in said means for containing liquid, said float means is caused to rise into said body and block further occasional lateral rod means motion until said accumulated liquid is removed from said means for containing liquid and said float means descends out of said body.

\* \* \* \* \*